July 25, 1950        F. JACOBSON        2,516,631

COUPLING FOR TUBING

Filed Feb. 7, 1946

INVENTOR
Franz Jacobson
BY Kenyon & Kenyon
ATTORNEYS

Patented July 25, 1950

2,516,631

UNITED STATES PATENT OFFICE 2,516,631

COUPLING FOR TUBING

Franz Jacobson, New York, N. Y.

Application February 7, 1946, Serial No. 646,062

6 Claims. (Cl. 285—74)

The present invention relates to a novel and advantageous fitting or coupling and more particularly to a fitting or coupling of this character that is particularly adapted for use with flexible metal tubing or hose.

The invention, as disclosed hereinafter, is described more particularly as applied to the construction of so-called sweat fittings for flexible metal tubing or hose used in the construction of flexible vibration eliminators installed in pipe lines for refrigeration and air conditioning equipment.

It should be understood that the principles of this invention can be applied not only to fittings of the sweat fitting type but also to other types of fittings or couplings, as for instance those provided with threaded ends, or those provided with beveled ends for welding.

By the use of the so-called sweat fittings in carrying out this invention, several important conditions are met and advantages attained. (1) The centerline of the fitting is automatically aligned with reference to the longitudinal axis of the flexible tubing, (2) no braze and flux can enter into the inside of the flexible tube, (3) the bore of the fitting is not restricted with reference to the inside diameter of the rigid tubing to be connected with the fitting, and (4) the flow of fluid is not obstructed in the sweat fitting.

The matter of alignment of the centerline of the fitting with the longitudinal axis of the flexible tubing is of importance in that, if such alignment does not exist (that is to say, the centerline of the fitting is either offset with respect to the longitudinal axis of the flexible tube or stands obliquely to said longitudinal axis), the flexible tube will, as a result, be subjected to very detrimental stresses when under vibration. This may cause premature failure of the flexible tube and costly interruption of productive operations or use.

The prevention of entry of braze and flux into the flexible tubing is important as the flexible tubing used in refrigeration and air conditioning equipment must be kept chemically clean. Heretofore, connections of this sort, if brazed in the customary way, had to be chemically cleaned to remove impurities including those contained in flux.

In order to supply a full flow through the fitting, equivalent to the inside diameter of the rigid copper tubing to be connected with the sweat fitting, and still provide a central guide projecting into the flexible tubing, it is necessary to make the inside diameter of the flexible tubing somewhat larger than the inside diameter of the rigid tubing to be connected with the sweat fitting.

A special adapter is used for connecting the tubing and other parts. The leading end of this adapter and its bore are shaped to insure unobstructed flow through the sweat fitting.

In order to meet all of said requirements, a one-piece sweat fitting can be designed. However, since this would involve difficulties of a manufacturing nature, the preferred procedure is to use standard commercial sweat fittings in conjunction with an adapter which can be made on screw machines at little cost.

Important objects of this invention are to provide structure meeting the foregoing requirements.

Another object of the invention is to provide structure meeting the foregoing requirements and adapted to be manufactured readily in quantity and at comparatively low cost.

To the accomplishment of the foregoing and such other objects as may hereinafter appear, this invention consists in the novel construction and arrangement of parts hereinafter to be described, and then sought to be defined in the appended claims, reference being had to the accompanying drawing forming a part hereof which shows merely for the purposes of illustrative disclosure, a preferred embodiment of the invention, it being expressly understood, however, that changes may be made in practice within the scope of the claims without digressing from the inventive idea.

Figure 1:
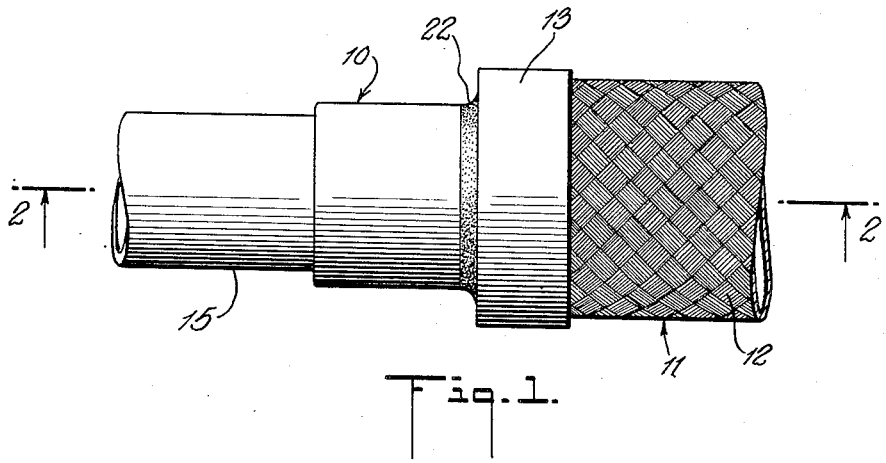
Fig. 1 is an elevational view of flexible tubing and rigid tubing or pipe joined by a fitting embodying my invention.
Figure 2:
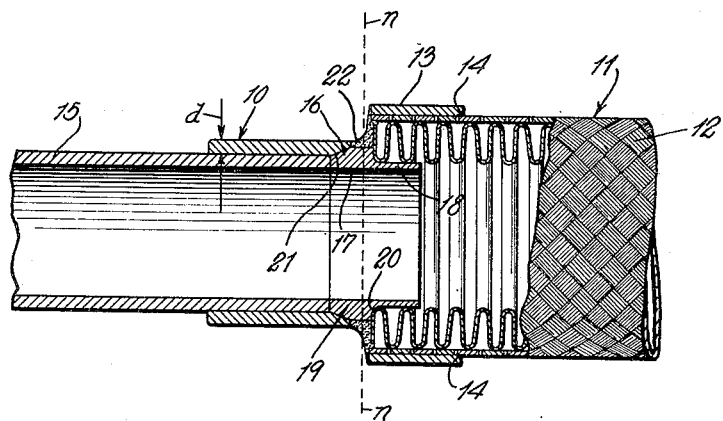
Fig. 2 is a longitudinal section taken along line 2—2 of Fig. 1 and viewed in the direction of the arrows.
Figure 3:
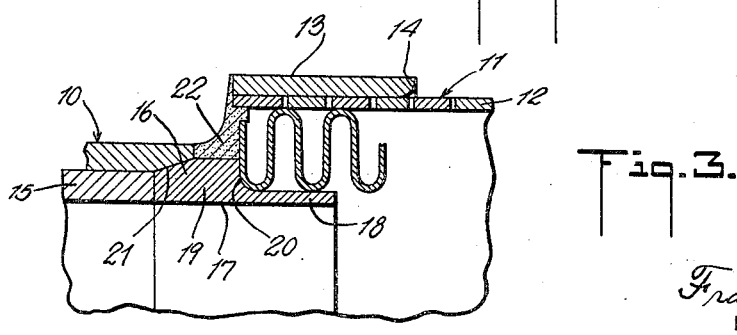
Fig. 3 is a fragmentary longitudinal section taken along line 2—2 of Fig. 1 and viewed in the direction of the arrows.

In the drawing, 10 denotes a sweat fitting which is preferably of a standard commercial form. The flexible, corrugated metal tubing 11 is covered with metallic braid 12 and is provided with a braid protecting end sleeve 13, preferably of heavy gauge seamless metallic tubing. This sleeve is provided at its rear end with a bell shaped or curved internal contour 14 to prevent damage to the braid 12. Said flexible tubing 11 has an internal diameter that is a little larger than standard, that is, a little larger in diameter than the internal diameter of the rigid tube 15 which is to be joined to the sweat fitting 10. The sweat fitting overhangs the end of the rigid tube 15.

A tubular adapter 16 has a continuous bore 17 of a diameter equal to the inside diameter of the rigid tube 15. A cylindrical guide portion 18 of the adapter at one end thereof has an external diameter admeasured for sliding fit within the flexible tubing 11. The central portion 19 of the adapter is thicker than the guide portion 18 and is preferably cylindrical and has an external diameter somewhat greater than the internal diameter of the tubing 11, thus defining a shoulder 20, which is preferably rounded, against which the end of flexible tubing 11 bears or abuts. The guide portion 18 and shoulder 20 serve to hold adapter 16 in perfectly centrally aligned position with the tubing 11 preparatory to brazing or welding. The opposite end of the adapter 16 is preferably formed with a slightly tapered conical portion 21 which is admeasured to form a press fit with an end of the sweat fitting 10. The conical portion 21 begins a short distance from the shoulder 20 so as to facilitate a perfect brazing or welding job whereby flexible hose 11, adapter 16 and the sweat fitting 10 are joined together into a single homogeneous unit. The fused metal fillet 22 formed by brazing or welding, it will be noted, effects a fused metallic joint between the sweat fitting 10, the sleeve 13, the flexible tubing 11, and its braid 12, and the adapter 16.

A unit having the structure above described will offer not only the four advantages previously enumerated but, in addition, the advantage of double strength at the circular line $n$ of greatest stress. This is on account of the provision of the additional thickness of the cylindrical portion 17 plus the thickness of the braze fillet 22, which is equivalent to the thickness $d$ of sweat fitting 10, plus the fillet 22 formed by brazing or welding. Moreover, a very great advantage is obtained due to the fact that high-priced welders do not need to waste their time in endeavoring to insure perfect alignment of sweat fitting 10 and flexible tubing 11. The end of the flexible tubing automatically is aligned upon insertion into it of guide 18 until shoulder 20 abuts the said end.

Another important and, under certain conditions, invaluable advantage is attained by this invention, when elbows, T's, or other irregular shapes have to be brazed or welded to flexible tubing. Whereas the old practice made it nearly impossible to exactly align the centerline of the flow through the irregular shape with the centerline of the flexible tubing unless special jigs were used, this invention permits quick and exact alignment automatically and without special jigs or other devices simply by the insertion of guide portion 18 of the adapter into the end of the flexible tubing 11 until the shoulder 20 abuts the said end of the tubing 11.

While a specific embodiment has been disclosed, it will be understood that changes in structural detail are contemplated and are possible without departing from the true scope and spirit. There is no intention, therefore, of limitation to the exact details shown and described.

What is claimed is:

1. A device for coupling flexible metallic tubing to rigid tubing, comprising a fitting for said rigid tubing, a flexible metallic tubing, a protective end sleeve on said flexible tubing, a tubular adapter projecting from said fitting, said adapter having a tubular guide portion insertable into an end of said flexible tubing and a thickened portion adjacent the guide portion defining a shoulder against which said end of the flexible tubing abuts, and a fused metallic connection between said fitting, said flexible tubing, said sleeve and said adapter in the region of said thickened portion and said shoulder.

2. A device for coupling flexible metallic tubing to rigid tubing, comprising a sweat fitting for the tubing, a flexible metallic tubing, a protective end sleeve on said flexible tubing, a tubular adapter; said adapter having a guide portion insertable into an end of said flexible tubing, a thickened cylindrical portion adjacent the guide portion defining a shoulder against which said end of the flexible tubing abuts, and a conical portion inserted into said sweat fitting with a press fit; and a fused metallic connection between said sweat fitting, said sleeve, said flexible tubing and said adapter in the region of said thickened portion and said shoulder.

3. A device for coupling flexible metallic tubing to rigid tubing, a sweat fitting for said rigid tubing with a portion extending beyond the end thereof, a flexible metallic tubing, a protective end sleeve on said flexible tubing, a tubular adapter; said adapter having a tubular guide portion insertable into an end of said flexible tubing with a slide fit, a thickened portion adjacent said guide portion whose external diameter is greater than the internal diameter of said flexible tubing and defining a shoulder against which said flexible tubing end abuts, and a tapered portion adjacent said thickened portion inserted into an end of said sweat fitting with a press fit; and a fused metallic joint between said sweat fitting, said flexible tubing, said sleeve and said adapter in the region of said thickened portion and said shoulder, said flexible tubing having a greater internal diameter than said rigid tubing, and said adapter having an internal diameter equal to that of said rigid tubing.

4. A tubular adapter for coupling flexible metallic tubing to rigid tubing, said adapter having a tubular guide portion insertable into an end of said flexible tubing with a slide fit, a portion or greater external diameter adjacent said guide portion and defining a shoulder at the junction between said two portions, and a portion tapered on its outer surface adjacent said widened portion, said adapter having an internal bore of unrestricted size throughout its length.

5. A device for coupling flexible metallic tubing to rigid tubing, comprising a fitting for said rigid tubing, a flexible metallic tubing, a protective end sleeve on the said flexible tubing; a tubular adapter having a guide portion insertable into the end of said flexible tubing enclosed by said protective sleeve, a portion of greater dimensions externally and defining a shoulder against which said end of the flexible tubing abuts, and an externally tapered portion secured in said fitting; and a fused metallic connection between said fitting, said flexble tubing, said sleeve and said adapter.

6. A device for coupling flexible metallic tubing or hose to rigid metal tubing, comprising a corrugated flexible metallic tube having an internal diameter greater than that of the rigid metal tubing to which it is to be coupled, an outer protective metal sleeve at the end of said flexible tubing or hose, a fitting for the end of said flexible tubing or hose, an inner tubular metallic adapter having a guide portion inserted into the end of said flexible tubing, a portion of greater dimensions externally and defining a shoulder against which said end of the flexible tubing abuts and an externally tapered portion adapted to be pressed into said fitting, said tapered portion being so admeasured in length that it positions said adapter respecting said fitting to cause said shoulder to form a stop for said rigid tubing, said adapter having an internal diameter about equal to the internal diameter of said rigid tubing, a hollow cylindrical metallic sweat fitting or coupling having a tapered portion at one end to receive the corresponding tapered portion of said adapter and a cylindrical bore adapted to receive the end of said rigid tubing; said fitting, adapter, flexible tubing and sleeve being connected together by fused metal.

FRANZ JACOBSON.

REFERENCES CITED

The following references are of record in the file of this patent:

UNITED STATES PATENTS

| Number | Name | Date |
| --- | --- | --- |
| 534,896 | Lennihan | Feb. 26, 1895 |
| 995,209 | Witzermann | June 13, 1911 |
| 2,240,413 | Parker | Apr. 29, 1941 |